United States Patent [19]

Kinoshita et al.

[11] Patent Number: 6,137,902
[45] Date of Patent: Oct. 24, 2000

[54] LINEAR ESTIMATION METHOD FOR THREE-DIMENSIONAL POSITION WITH AFFINE CAMERA CORRECTION

[75] Inventors: Keisuke Kinoshita; Zhengyou Zhang, both of Kyoto, Japan

[73] Assignee: ATR Human Information Processing Research Laboratories, Kyoto, Japan

[21] Appl. No.: 09/115,516

[22] Filed: Jul. 15, 1998

[30] Foreign Application Priority Data

Jul. 22, 1997 [JP] Japan ..................................... 9-195611

[51] Int. Cl.[7] ............................... G06K 9/20; G06T 3/00
[52] U.S. Cl. ............................................. 382/154; 382/291
[58] Field of Search ..................................... 382/154, 106, 382/285, 291, 294, 296, 309, 312, 318, 319; 250/559.1, 559.23, 559.31, 559.38; 345/436, 358; 702/40, 86, 94, 95, 152, 153; 348/47, 48, 94, 116, 139; 356/3.14, 4.01, 12, 375; 901/47; 701/301; 396/578; 700/254

[56] References Cited

U.S. PATENT DOCUMENTS

| 5,757,674 | 5/1998 | Marugame | 364/559 |
| 6,009,210 | 12/1999 | Kang | 382/276 |
| 6,061,468 | 5/2000 | Kang | 382/154 |

FOREIGN PATENT DOCUMENTS

| 11-39506 | 2/1999 | Japan | G06T 15/00 |

OTHER PUBLICATIONS

James L. Crowley et al., Maintaining Stereo Calibration by Tracking Image Points, IEEE Computer Society Conference on Computer Vision and Pattern Recognition, Jun. 1993, pp. 483–488.

Remagnino, P. et al., "Correlation techniques in adaptive template matching with uncalibrated cameras", SPIE Vision Geometry III, 1994, vol. 2356, pp. 252–263.

Shashua, A. et al., "Relative Affine Structure: Theory and Application to 3D Reconstruction From Perspective Views", IEEE, 1994, pp. 483–489.

Mohr, R. et al., "Relative 3D Reconstruction Using Multiple Uncalibrated Images", The International Journal of Robotics Research, vol. 14, No. 6, Dec. 1995, pp. 619–632.

"Geometric Camera Calibration Using Systems of Linear Equations" by Gremban, Thorpe and Kanade. International Conference on Robotics and Automation, pp. 562–567 (1988).

"Self–Calibration of an Affine Camera From Multiple Views" by Quan. International Journal of Computer Vision, vol. 19, No. 1, pp. 93–105 (1996).

"Euclidean Shape and Motion from Multiple Perspective Views by Affine Iterations" by Christy and Horaud. IEEE Transactions of Pattern Analysis and Machine Intelligence, vol. 18, No. 11, pp. 1098–1104 (1996).

"Shape and Motion from Image Streams under Orthography: a Factorization Method" by Tomasi and Kanade. International Journal of Computer Vision, vol. 9, No. 2, pp. 137–154 (1992).

Primary Examiner—Leo H. Boudreau
Assistant Examiner—Brian P. Werner
Attorney, Agent, or Firm—McDermott, Will & Emery

[57] ABSTRACT

A plurality of cameras acquire images of a plurality of reference points located on known positions in a three-dimensional space, an image processor obtains the coordinates of projected points thereof on the respective images, and a plurality of affine cameras having linear relation between the three-dimensional space and images are assumed for calculating how the affine cameras project the respective reference points and correcting the coordinates of the projected points to be consistent with the projected points.

3 Claims, 3 Drawing Sheets

→ PROJECTION BY AFFINE CAMERA
--→ PROJECTION BY PERSPECTIVE CAMERA
--→ RECONSTRUCTION BY AFFINE CAMERA
→ CORRECTION FROM PROJECTION BY PERSPECTIVE CAMERA TO PROJECTION BY AFFINE CAMERA

LINEAR ESTIMATION METHOD FOR THREE-DIMENSIONAL POSITION WITH AFFINE CAMERA CORRECTION

BACKGROUND OF THE INVENTION

1. Field of the Invention

The present invention relates to a linear estimation method for a three-dimensional position with affine camera correction, and more particularly, it relates to a linear estimation method for a three-dimensional position with affine camera correction for estimating the three-dimensional position of an object point in a three-dimensional space from images acquired by a plurality of cameras in case of controlling a robot or the like with image information.

2. Description of the Prior Art

A method of acquiring an image of a point (object point) existing in a three-dimensional space with a camera and estimating its three-dimensional position is a central problem of computer vision. Stereoscopy can be referred to as the most basic technique for solving this problem. In the stereoscopy, two cameras located on previously known positions in previously known orientations acquire images of an object point, for deciding its three-dimensional position from the projected images with the principle of triangulation. In such stereoscopy, it is necessary to correctly measure the positions, orientations and focal lengths of the cameras. This is called camera calibration, which has generally been studied in the fields of computer vision and robotics. In this case, the relation by perspective projection is generally employed as the method of describing the relation between the three-dimensional space and the images.

This perspective projection model can be regarded as an ideal model for general cameras. Despite its correctness, however, this projective model is nonlinear. Due to such non-linearity, three-dimensional position estimation is weak against computation errors or measurement errors of the projected points.

Study has been made for approximating the perspective projection model with a camera model which has better properties. For example, "Geometric Camera Calibration using Systems of Linear Equations" by Gremban, Thorpe and Kanade, International Conference on Robotics and Automation, pp. 562–567 (1988) applies approximation of a camera model to camera calibration. Thereafter study of an affine camera model has been developed in "Self-Calibration of an Affine Camera from Multiple Views" by Quan, International Journal of Computer Vision, Vol. 19, No. 1, pp. 93–105 (1996). The affine camera model describes a three-dimensional space and images in linear relation. It is known that the affine camera model solves problems resulting from non-linearity and provides sufficiently good approximation of a perspective projection model if the thickness of the object is sufficiently smaller than the distance between the camera and the object.

"Euclidean Shape and Motion from Multiple Perspective Views by Affine Iterations" by Christy and Horaud, IEEE Transactions on Pattern Analysis and Machine Intelligence, Vol. 18, No. 11, pp. 1098–1104 (1996) describes an applied example of this affine camera model in three-dimensional position estimation. This example is adapted to approximately estimate the three-dimensional position of an object point with an affine camera model for optimizing nonlinear equations obtained from a perspective camera with the approximate value employed as an initial value thereby further correctly estimating the three-dimensional position of the object point. However, this method requires the operation of optimizing the nonlinear equations, and cannot be regarded as a simple solution.

Multiple-camera stereoscopy employing a plurality of (at least two) cameras forms another flow of the stereoscopy. In the multiple-lens stereoscopy, it is expected that the information content increases as compared with the case of employing only two cameras and the three-dimensional position can be further stably estimated. For example, "Shape and Motion from Image Streams under Orthography: a Factorization Method" by Tomasi and Kanade, International Journal of Computer Vision, Vol. 9, No. 2, pp. 137–154 (1992) describes an example of such multiple-camera stereoscopy. According to Tomasi et al., it is possible to estimate a three-dimensional position by a simple method called a factorization method, if a plurality of orthographic projection cameras can be assumed. If the cameras are not orthographic projection cameras, however, it is necessary to satisfy nonlinear constraint condition called epipolar constraint for three-dimensional position estimation. Therefore, the three-dimensional position cannot be readily estimated.

SUMMARY OF THE INVENTION

Accordingly, a principal object of the present invention is to provide a linear estimation method for a three-dimensional position with affine camera correction, which can reduce influence by computation errors or noise by simplifying estimation of the three-dimensional position of an object point by employing a plurality of images and correcting projected images acquired by cameras modeled by perspective projection to images acquired by a simple linear camera model.

Briefly stated, the present invention is directed to a method of obtaining the three-dimensional position of an object point with a plurality of cameras, by acquiring images of a plurality of reference points located on known positions in a three-dimensional space with the plurality of cameras, obtaining the coordinates of the projected points on the respective images, assuming a plurality of affine cameras having linear relation between the three-dimensional space and images, calculating how the affine cameras project the respective reference points, and correcting the coordinates of the projected points to be consistent with the projected points.

According to the present invention, therefore, the virtual affine cameras project all reference points once again without knowing correct projective models of the respective cameras for estimating the three-dimensional position, whereby it is possible to estimate the three-dimensional position with no regard to the types, positions and orientations of the cameras. Further, the calculation itself is simple, the three-dimensional position can be stably estimated in a linear form from the virtual affine cameras, and influence by computation errors or noise can be reduced.

In a more preferable embodiment of the present invention, coefficients of a second order polynominal of the coordinates of the projected points are regarded as parameters for the correction, for estimating the three-dimensional position of an arbitrary object point in the three-dimensional space in response to decision of the parameters. Further, projected points of the object point are corrected in accordance with the second order polynominal to be consistent with the coordinates of the projected points by the virtual affine cameras, for estimating the three-dimensional position of the object point by linear calculation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
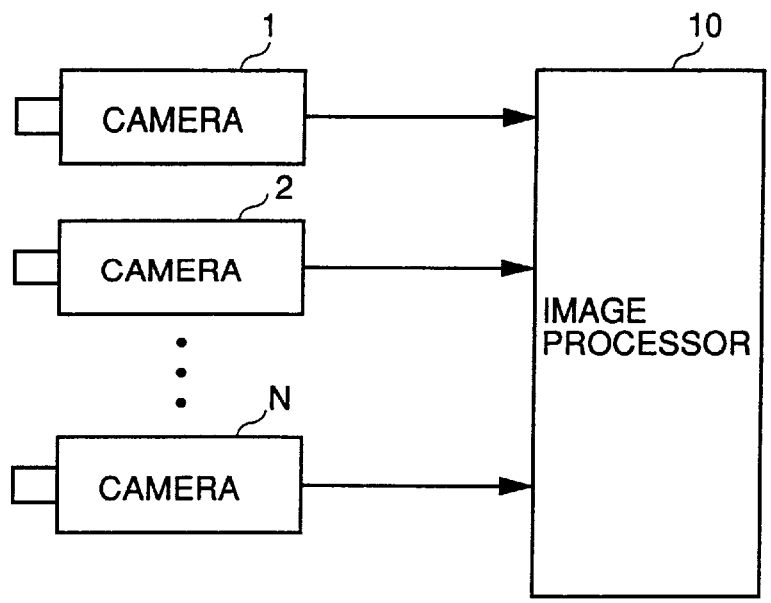
FIG. 1 is a schematic block diagram showing an apparatus for carrying out an embodiment of the present invention.

FIG. 1 is a schematic block diagram showing an apparatus for carrying out an embodiment of the present invention.

Referring to FIG. 1, a plurality of cameras 1, 2, ..., N acquire images of a plurality of reference points located on known positions in a three-dimensional space and supply outputs thereof to an image processor 10, which in turn forms images acquired by virtual affine cameras and estimates a three-dimensional position by linear operation.

Figure 2:
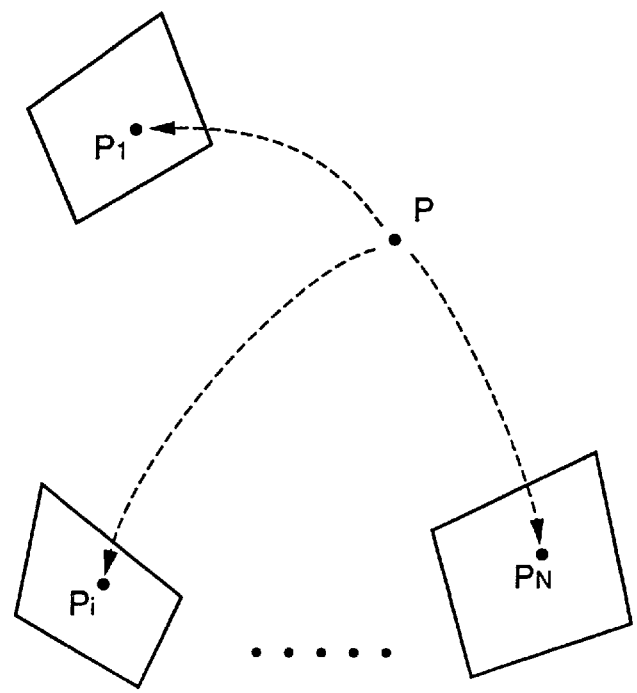
FIG. 2 is a conceptual diagram showing a state of acquiring images of a point P in a three-dimensional space with N cameras.

FIG. 2 is a conceptual diagram showing a state of acquiring images of a point P in a three-dimensional space with N cameras. Definition of a camera model is now described with reference to FIG. 2. It is assumed that P stands for the point in the three-dimensional space and p stands for the position of its projected image on each image. Expressing these as P__ and p__ on homogeneous coordinates respectively, the following relation is obtained:

$$p_\_ \cong M P_\_$$

where M represents a 3×4 matrix called a projective matrix, which expresses the projective model, the positions, orientation and optical properties of the cameras. Such a camera model is called a perspective camera model if the matrix M can be decomposed as follows:

$$M = \begin{pmatrix} f_u & 0 & u_0 \\ 0 & f_v & v_0 \\ 0 & 0 & 1 \end{pmatrix} \begin{pmatrix} 1 & 0 & 0 & 0 \\ 0 & 1 & 0 & 0 \\ 0 & 0 & 1 & 0 \end{pmatrix} \begin{pmatrix} R & t \\ 0 & 1 \end{pmatrix}$$

where $f_u$ and $f_v$ represent the focal lengths of the cameras, $u_0$ and $v_0$ represent the image centers, and R and t represent orientation and position of the camera expressed with rotation matrix and translation vector, respectively. These form an ideal model for general cameras.

When the first to third columns on the fourth row of a matrix $M_A$ are zero, on the other hand, such a camera model is called an affine camera model.

$$M_A = \begin{pmatrix} * & * & * & * \\ * & * & * & * \\ 0 & 0 & 0 & * \end{pmatrix}$$

Returning from the homogeneous coordinate expression to the generally employed Euclidean coordinate expression, the coordinates $p_A$ of the projected point p on the images can be related in the affine camera model as follows, assuming that $P_A$ represents the three-dimensional coordinates of the point P:

$$p_A = C_A P_A + d$$

where $C_A$ represents a 2×3 matrix. An arbitrary point $P_G$ in the three-dimensional space and its projected point $p_G$ on the image are assumed here. $P_A$ and $p_A$ are expressed in a new coordinate system with the origins at $P_G$ and $p_G$ respectively. Assuming that $P'=P_A-P_G$ and $p'=p_A-p_G$, the term d vanishes to provide the following compact expression:

$$p' = C_A P' \tag{1}$$

It has been recognized that the three-dimensional space P' and the image p' can be related with each other by the 2×3 matrix $C_A$ if employing the coordinates with previous subtraction of $P_G$ and $p_G$. This matrix $C_A$ is called an affine camera matrix. For example, if there are a number of points, it is convenient to employ center of gravity of these points as $P_G$. A projected point of the center of gravity $P_G$ in the three-dimensional space is consistent with the center of gravity $p_G$ of the projected points on the images. The following description is made with reference to a coordinate system from which the center of gravity is previously subtracted.

Figure 3:
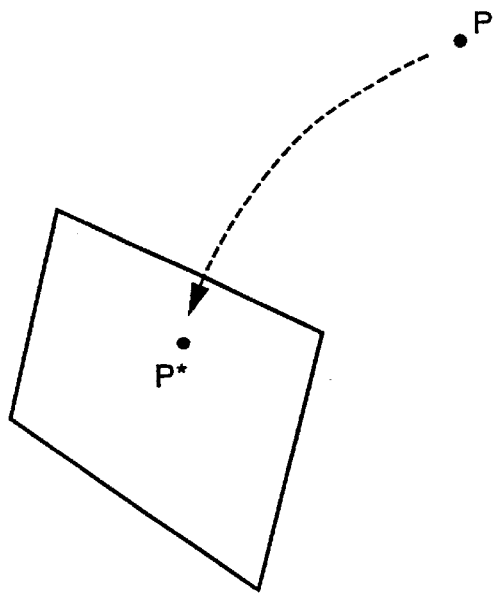
FIG. 3 is a conceptual diagram of extended cameras.
Figure 4:
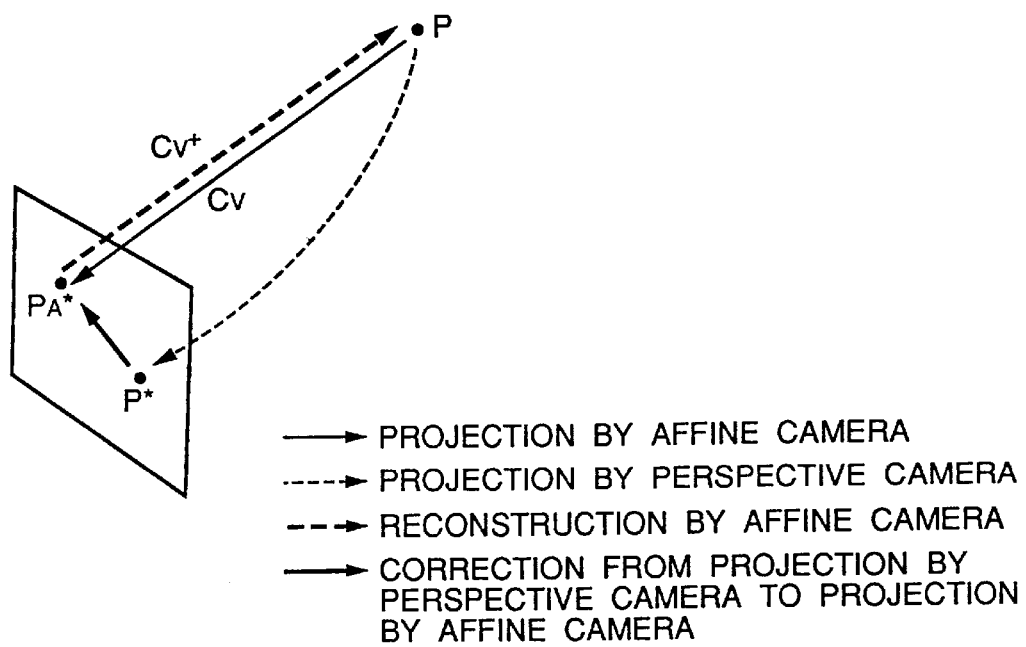
FIG. 4 is adapted to illustrate correction from projection by perspective cameras to that by affine cameras.

FIG. 3 is a conceptual diagram of extended cameras, and FIG. 4 is adapted to illustrate correction from projection by perspective cameras to that by affine cameras.

The relation between the three-dimensional space and a plurality of images acquired by the plurality of cameras is shown. It is assumed that, in case of acquiring images of the point P in the three-dimensional space by the plurality of (N) cameras as described above, $p_1, \ldots, p_N$ denote projected points of the point P in the respective cameras is shown. These projected points, which are obtained by acquiring images of the point P with the N cameras, can also be regarded as projection of the point P in the three-dimensional space onto 2N-dimensional "image" as shown in FIG. 3. The cameras thus projecting the object in the three-dimensional space onto the 2N-dimensional image as shown in FIG. 3 are referred to as extended cameras. It must be noted here that the extended cameras are in a redundant observation system causing no dimensional degeneration from three dimensions.

A coordinate system having the origins at an arbitrary point (generally the center of gravity) and its projected images is employed. It is assumed that $P_A$ and $p_i$ represent the coordinates of the point P and the projected point on the position P of an image i, to obtain the following expression:

$$p^* = \begin{bmatrix} p_1 \\ \vdots \\ p_N \end{bmatrix} \quad (2)$$

This can be regarded as the coordinates of the projected points in the extended cameras.

Assuming that the respective cameras are affine cameras and $C_i$ represents the affine camera matrix in a camera i, the following relation is obtained from the expression (1):

$$p_{Ai} = C_i P_A$$

As to all cameras, the relation can be described as follows:

$$p^*_A = C_V P_A \quad (3)$$

where $C_V$ is in the following relation:

$$C_V = \begin{bmatrix} C_1 \\ \vdots \\ C_N \end{bmatrix} \quad (4)$$

$p^*_A$ represents 2N_ vectors, and $C_V$ represents a 2N×3 matrix. The matrix $C_V$ corresponds to an affine camera matrix of the extended cameras on the assumption that the respective cameras are affine cameras.

If $C_V$ is known under the relation of the expression (3), the three-dimensional position $P_A$ of the point P can be solved from the images $p^*_A$. The following expression (5) may hold with a pseudo-inverse matrix of $C_V$:

$$P = C_V^+ p^*_A \quad (5)$$

If the observed values $p^*_A$ are noiseless, i.e., if $p^*_A$ are correctly observed, $P_A$ obtained by the expression (5) is a correct three-dimensional position. Namely, this $P_A$ is not an approximate solution, but the correct three-dimensional position can be reconstructed under the assumption of the affine cameras. If $p^*_A$ have noise, on the other hand, the solution of the expression (5) is an estimation minimizing $\|p^*_A - C_V P_A\|$, i.e., minimizing errors on images acquired by extended affine cameras. If the extended affine cameras are assumed, the relation between the coordinates $P_A$ of the three-dimensional space and the images $p^*_A$ is linear. It is obvious that resistance against analysis or noise is remarkably superior to that of nonlinear relation, due to the linear relation.

It has been recognized that the three-dimensional position of the point in the three-dimensional space can be linearly reconstructed if extended affine cameras can be assumed. This is only when affine cameras can be assumed, and it is readily inferable that perspective cameras cannot correctly reconstruct the three-dimensional position in the method of the expression (5) even with noiseless images. If images equivalent to those acquired by affine cameras can be formed from acquired by perspective cameras with some method, however, it must be possible to linearly estimate the three-dimensional position with such images.

Images acquired by perspective cameras are corrected to those equivalent to images acquired by affine cameras here. While epipolar geometric constraint may be employed for this correction, a correction method which is as simple as possible is employed here. The following description is made with reference to extended cameras.

As shown in FIG. 4, it is assumed that p* represents images of the point P in the three-dimensional space acquired by the actual N cameras shown in FIG. 1. Considering virtual extended affine cameras provided by the matrix $C_V$, it is assumed that $p^*_A$ represent images of the point P acquired by these cameras. The images p* are corrected to be consistent with $p^*_A$. While various methods may be employed for this correction, the k-th element $(p^*_A)_k$ ($1 \leq k \leq 2N$) of $p^*_A$ is approximated with a second order polynominal of p*, i.e., modeled in the following expression (6):

$$(p^*_A)_k = p^{\sim *T} T_k p^{\sim *} \quad (6)$$

where $$p^{\sim *} = \begin{bmatrix} p^* \\ 1 \end{bmatrix},$$

and $T_k$ represents a (2N+1)×(2N+1) symmetrical matrix.

The degree of freedom of T, which is 2N×(2N+1)×(N+1) in total, can conceivably sufficiently describe a perspective camera model. It is to be noted that T is common for all points. T is a parameter decided by the projection method of the actual cameras and the properties and arrangement of the cameras such as the positions and orientations thereof. Therefore, this parameter T can be continuously used unless the cameras are moved or the focal lengths thereof are varied.

A three-dimensional reconstruction method is now described in detail. In order to concretely decide the three-dimensional position of the object point, two stages are necessary. The first stage is a calibration stage for deciding the parameters $C_V$ of the virtual extended affine cameras and the parameter T for correction. The second stage is an estimation stage for correcting the images acquired by the actual cameras to be equivalent to those projected by the extended affine cameras and linearly estimating the three-dimensional position of the object point.

Figure 5:
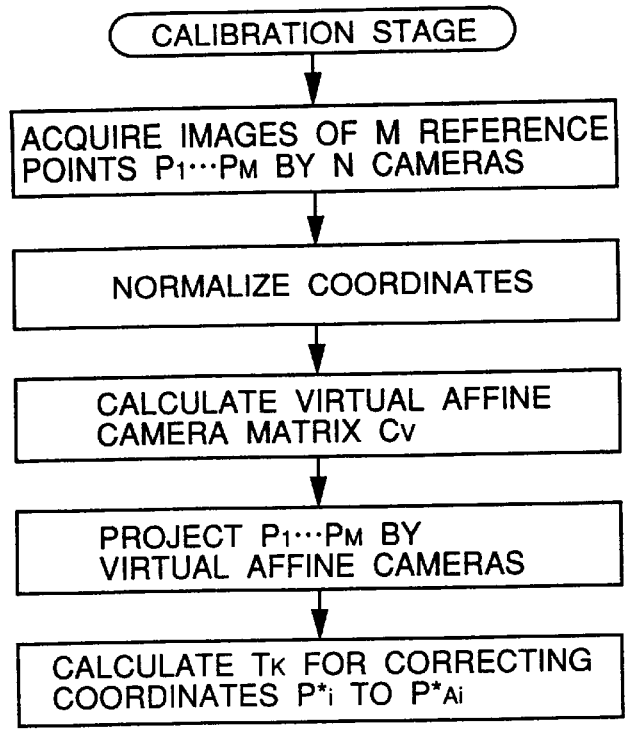
FIG. 5 is a flow chart of a calibration stage in the embodiment of the present invention.
Figure 6:
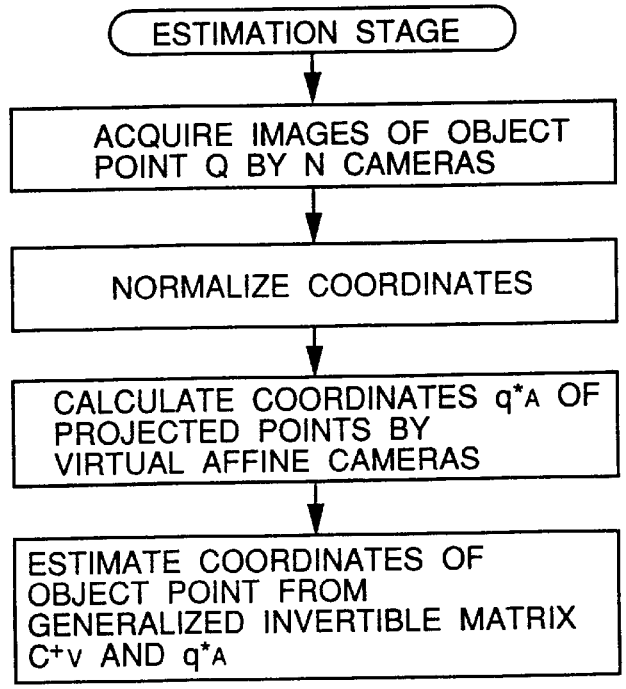
FIG. 6 is a flow chart of an estimation stage.

FIGS. 5 and 6 are flow charts of the calibration and estimation stages respectively. The image processor shown in FIG. 1 carries out a program based on these flow charts.

The calibration stage is now described with reference to FIG. 5. In order to reconstruct three-dimensional position information, the extended affine camera matrix $C_V$ and the matrix T for correction must be obtained. This operation can be regarded as system calibration. Employed therefor are M reference points $P_1, \ldots, P_N$ located on previously known three-dimensional positions and projected images $p^*_1, \ldots, p^*_N$ obtained by these N cameras. Either a lattice for calibration or an arbitrary sequence of points may be employed. Considering that the inventive method is an approximate three-dimensional reconstruction method, however, the reference points $P_1, \ldots, P_M$ are preferably set in an area not much different from that of the three-dimensional space to be estimated in practice.

The virtual extended affine camera matrix $C_A$ is first obtained from the sequence of reference points $P_1, \ldots, P_M$. Basically the matrix $C_V$ may be any matrix, since images acquired by affine cameras can be converted to those acquired by arbitrary affine cameras by affine transformation. In consideration of the fact that the inventive method is approximation, the parameters of the virtual affine cameras may be selected to be the best approximation of the actual cameras. Assuming that all cameras are affine cameras, there must be the following relation:

$$C_V[P_1 \ldots P_M] = [p^*_1 \ldots p^*_M]$$

$P_1, \ldots, P_M$ and $p^*_1, \ldots, p^*_M$ are coordinates normalized by subtracting the center of gravity. This equation is so guided as to minimize the total $\|[p^*_1 \ldots p^*_M] - C_0[P_1 \ldots P_M]\|$ of errors of all points in the extended cameras, for obtaining the following expression (7):

$$C = [p^*_1 \ldots p^*_M] + [P_1 \ldots P_M] \quad (7)$$

Then, the matrix T for correction is obtained. Assuming that the extended affine cameras $C_V$ acquire images of $P_j$, projection is made on $p^*_{Aj} = C_V P_j$ on the images. $p^*_j$ is corrected to obtain $p^*_{Aj}$. As hereinabove described, this correction is carried out in accordance with the following expression:

$$(p^*_{Aj})_k = p^{-*T}_j T_k p^{-*}_j$$

Since $p^*_j$ and $p^*_{Aj}$ ($1 \leq j \leq M$) are obtained, a linear equation may be solved in relation to the element of the term $(2N+1) \times (N+1)$ of each $T_k$.

On the aforementioned assumption, the virtual affine camera matrix $C_V$ and the correction matrix $T_k$ ($1 \leq k \leq 2N$) 1 are decided from the three-dimensional positions $P_j$ of the M reference points and the projected images $p^*_{ij}$ thereof by the N cameras.

The three-dimensional position estimation method is now described with reference to FIG. 6. Similarly to the aforementioned calibration stage, the N cameras acquire images of the object point P to obtain projected images $q^*$, whose coordinates are normalized in consideration of the center of gravity $P_G$ of the reference points and the center of gravity $p^*_G$ in each camera. In order to obtain projected images $q^*_A$ equivalent to those acquired by the virtual extended affine cameras $C_V$, correction is made in accordance with the following expression:

$$(q^*_A)_k = q^{-*T} T_k q^{-*}$$

($1 \leq k \leq 2N$)

With the obtained $q^*_A$, the three-dimensional position Q is estimated in accordance with the following expression (8):

$$Q = C_V^+ q^*_A \quad (10)$$

According to the embodiment of the present invention, the virtual affine cameras project all reference points once again without knowing correct projective models of the respective cameras for estimating the three-dimensional position, whereby it is possible to estimate the three-dimensional position with no regard to the types, positions and orientations of the cameras. Further, the calculation itself is simple, and the three-dimensional position can be stably estimated in a linear form from the virtual affine cameras. Thus, influence by computational errors or noise can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear estimation method for obtaining a three-dimensional position of an object point with a plurality of cameras, comprising:

a first step of acquiring images of a plurality of reference points being located on known positions in said three-dimensional space by said plurality of cameras and obtaining coordinates of projected points thereof on respective said images; and a second step of assuming a plurality of affine cameras having linear relation between said three-dimensional space and images, calculating coordinates of affine camera projected points corresponding to how said reference points are projected by said affine cameras and correcting the coordinates of said obtained projected points to be consistent with the coordinates of said affine camera projected points;

wherein said second step regards coefficients of a second order polynomial of the coordinates of said affine camera projected points as parameters for correction.

2. The method of linearly estimating a three-dimensional position in accordance with claim 1, further including a step of estimating the three-dimensional position of an arbitrary object point in said three-dimensional space in response to decision of said parameters for correction.

3. The method of linearly estimating a three-dimensional position in accordance with claim 2, further including a step of correcting projected points of said object point with said second order polynominal to be consistent with the coordinates of said affine camera projected points and estimating the three-dimensional position of said object point by linear calculation.

* * * * *